United States Patent
Bennett

(10) Patent No.: US 10,683,733 B2
(45) Date of Patent: Jun. 16, 2020

(54) DOWNHOLE EXPANDABLE TUBULAR MEMBERS WITH SEALED RELEASABLE CONNECTION

(71) Applicant: Enventure Global Technology, Inc., Houston, TX (US)

(72) Inventor: Frederick Cornell Bennett, Houston, TX (US)

(73) Assignee: Enventure Global Technology, Inc., Houston, TX (US)

( * ) Notice: Subject to any disclaimer, the term of this patent is extended or adjusted under 35 U.S.C. 154(b) by 170 days.

(21) Appl. No.: 15/780,126

(22) PCT Filed: Dec. 14, 2016

(86) PCT No.: PCT/US2016/066478
§ 371 (c)(1),
(2) Date: May 30, 2018

(87) PCT Pub. No.: WO2017/106241
PCT Pub. Date: Jun. 22, 2017

(65) Prior Publication Data
US 2018/0347289 A1  Dec. 6, 2018

Related U.S. Application Data

(60) Provisional application No. PCT/US2016/066478, filed on Dec. 14, 2016, provisional application No. 62/268,024, filed on Dec. 16, 2015.

(51) Int. Cl.
*E21B 43/10* (2006.01)
*F16L 13/14* (2006.01)
*F16L 15/08* (2006.01)

(52) U.S. Cl.
CPC .......... *E21B 43/106* (2013.01); *E21B 43/105* (2013.01); *F16L 13/147* (2013.01); *F16L 15/08* (2013.01)

(58) Field of Classification Search
CPC .................................................. E21B 43/106
See application file for complete search history.

(56) References Cited

U.S. PATENT DOCUMENTS

| | | |
|---|---|---|
| 2004/0244979 A1 | 12/2004 | Adam et al. |
| 2006/0208488 A1 | 9/2006 | Costa |
| 2007/0057508 A1 | 3/2007 | MacAulay et al. |
| 2007/0187113 A1 | 8/2007 | Hester |
| 2008/0066929 A1 | 3/2008 | Costa et al. |
| 2011/0094753 A1 | 4/2011 | Whiddon |
| 2011/0220369 A1 | 9/2011 | DeLange et al. |
| 2012/0152565 A1 | 6/2012 | Bennett et al. |
| 2012/0152567 A1 | 6/2012 | Whiddon et al. |

(Continued)

*Primary Examiner* — Robert E Fuller
(74) *Attorney, Agent, or Firm* — Jonathan Pierce; Pierre Campanac; Porter Hedges LLP

(57) ABSTRACT

An apparatus for expanding tubular members in a wellbore, such as casing, liners, sand screens, or other expandable tubular members, includes a first downhole tubular member, a second downhole tubular member that is radially expandable, and a sealed releasable connection coupling the first and second downhole tubular members. The sealed releasable connection is configured to decouple the first and second downhole tubular members by expansion of the second downhole tubular member. The sealed releasable connection had a metal-to-metal seal formed between the first and second downhole tubular members.

17 Claims, 4 Drawing Sheets

(56) References Cited

U.S. PATENT DOCUMENTS

| | | |
|---|---|---|
| 2012/0273231 A1 | 11/2012 | Whiddon |
| 2012/0325361 A1 | 12/2012 | Durivault et al. |
| 2013/0299197 A1 | 11/2013 | Bennett |
| 2015/0285009 A1 | 10/2015 | Bennett |

DOWNHOLE EXPANDABLE TUBULAR MEMBERS WITH SEALED RELEASABLE CONNECTION

BACKGROUND

This disclosure relates generally to methods and apparatus for expanding tubular members in a wellbore, such as casing, liners, sand screens, or other expandable tubular members. More particularly, this disclosure relates to apparatus and methods that utilize downhole expandable tubular members coupled with a sealed releasable connection.

A branch of solid expandable technology involves apparatus for expanding tubular members that utilize hydraulic forces. As usual, these apparatus rely on an expansion cone to radially expand and plastically deform the tubular members, but in particular, these apparatus rely on pressure across a cup to displace the expansion cone along the tubular members. To expand the tubular members from down-hole to up-hole ends, the cup is typically located up-hole from the expansion cone. The cup seals against the tubular member that is expanded. A problem occurs when the cup exits the tubular member. The pressure across the cup is lost before an up-hole section of the tubular member located between the expansion cone, and the cup is expanded.

One possible solution may be to use a mechanical force on the expansion cone to finish expanding the tubular member, for example by pulling with rig equipment on the expansion cone via a work string. To be successful, this solution necessitates that the rig equipment has a pulling capacity that exceeds the force that resists displacement of the expansion cone relative to the expandable tubular member, and that the expandable tubular member is sufficiently well anchored in the wellbore so that it does not move with the expansion cone. Cases where this solution is unsuccessful, are sometimes encountered.

Thus, there is a continuing need in the art for methods and apparatus for expanding tubular members in a wellbore.

SUMMARY

In one aspect, the disclosure describes a downhole apparatus comprising a first tubular member disposed in a wellbore, a second tubular member disposed in the wellbore, and an expansion cone coupled to the second tubular member. The downhole apparatus further comprises a threaded connection coupling the first and second tubular members, axial slits to release the threaded connection in response to plastic deformation of the second tubular member caused by the expansion cone, and a metal-to-metal seal between the first and second tubular members. The downhole apparatus may further comprise an inner pipe. The inner pipe may have a through-bore to communicate pressure to a sealed volume inside one or more of the first and second tubular members. The downhole apparatus may further comprise a cup coupled to the inner pipe. The cup may be sealing the sealed volume across an annulus between the inner pipe and one or more of the first and second tubular members, whereby the pressure across the cup applies a force to the inner pipe. The expansion cone may be coupled to the inner pipe down-hole the sealing cup, whereby the force applied to the inner pipe displaces the expansion cone along one or more of the first and second tubular members.

The axial slits may reach an extremity of the second tubular member. A stress relieving hole may be formed at an end of at least one of the axial slits.

A pin end extending from the first tubular member may comprise an internal shoulder disposed at an extremity of the pin end. The pin end may further comprise a threaded portion. The pin end may further comprise an intermediate shoulder portion. The intermediate shoulder portion may have an outer Z profile. The intermediate shoulder portion may be disposed between the internal shoulder and the threaded portion. The pin end may further comprise a nose extension portion extending axially from the intermediate shoulder portion toward the internal shoulder. The pin end may further comprise a sealing portion partially forming the metal-to-metal seal. The sealing portion may be disposed between the nose extension portion and the internal shoulder. The nose extension portion may have an inner diameter that is less than the inner diameter of the threaded portion. The outer Z profile of the intermediate shoulder portion may comprise a stop surface. The outer Z profile of the intermediate shoulder portion may further comprise an outer groove located proximate the stop surface.

A box end extending from the second tubular member may comprise a sealing portion partially forming the metal-to-metal seal. The box end may further comprise an intermediate shoulder portion. The intermediate shoulder portion may have an inner Z profile. The box end may further comprise a pre-expanded portion. The pre-expanded portion may be disposed between the intermediate shoulder portion and the sealing portion. The pre-expanded portion may have an inner surface radially outward relative to innermost surfaces of the sealing and the intermediate shoulder portions. The box end may further comprise an internal shoulder disposed proximate the sealing portion.

In another aspect, the disclosure describes an apparatus comprising a first downhole tubular member, a second downhole tubular member that is radially expandable, and a sealed releasable connection coupling the first and second downhole tubular members. The sealed releasable connection is configured to decouple the first and second downhole tubular members by expansion of the second downhole tubular member. The sealed releasable connection has a metal-to-metal seal formed between the first and second downhole tubular members.

The sealed releasable connection may include a pin end. The pin end may have an external shoulder. The pin end may further have an intermediate shoulder portion. The intermediate shoulder portion may have an outer Z profile. The pin end may further have a threaded portion disposed between the external shoulder and the intermediate shoulder portion. The pin end may further have a nose extension portion extending axially from the intermediate shoulder portion. The pin end may further have a sealing portion partially forming the metal-to-metal seal and extending axially from the nose extension portion.

The sealed releasable connection may also include a box end. The box end may have a sealing portion partially forming the metal-to-metal seal. The box end may further have an intermediate shoulder portion. The intermediate shoulder portion may have an inner Z profile. The box end may further have a pre-expanded portion disposed between the intermediate shoulder portion and the sealing portion. The pre-expanded portion may register with the nose extension portion. The inner Z profile may register with the outer Z profile. The pre-expanded portion may have an inner surface radially outward relative to the innermost surfaces of the sealing and the intermediate shoulder portions.

In another aspect, the disclosure describes a method of expanding downhole tubular members. The method comprises coupling a first tubular member and a second tubular member with a releasable threaded connection, forming a metal-to-metal seal between the first and second tubular members, and providing the first and second tubular members in a wellbore. The method further comprises displacing an expansion cone through the second tubular member to plastically deform the second tubular member, and releasing the threaded connection and the first and second tubular members by displacing the expansion cone through the threaded connection.

The method may further comprise registering the pre-expanded portion of the second tubular member with the nose extension portion of the first tubular member. The method may further comprise registering the inner Z profile of the second tubular member with the outer Z profile of the second tubular member. The method may further comprise disengaging the internal shoulder of the box end from the internal shoulder of the pin end during radial expansion of the second tubular member. The method may further comprise communicating pressure from a surface pump to a sealed volume inside the second tubular member. The method may further comprise applying the pressure to a cup sealing the sealed volume. The cup may be coupled to the expansion cone. The method may further comprise displacing the cup to the first tubular member while maintaining the pressure in the second tubular member. The method may further comprise pulling on the expansion cone via a work string after the metal-to-metal seal formed between the first and second tubular members is broken.

BRIEF DESCRIPTION OF THE DRAWINGS

For a more detailed description of the embodiments of the present disclosure, reference will now be made to the accompanying drawings, wherein.

DETAILED DESCRIPTION

Figure 1A:
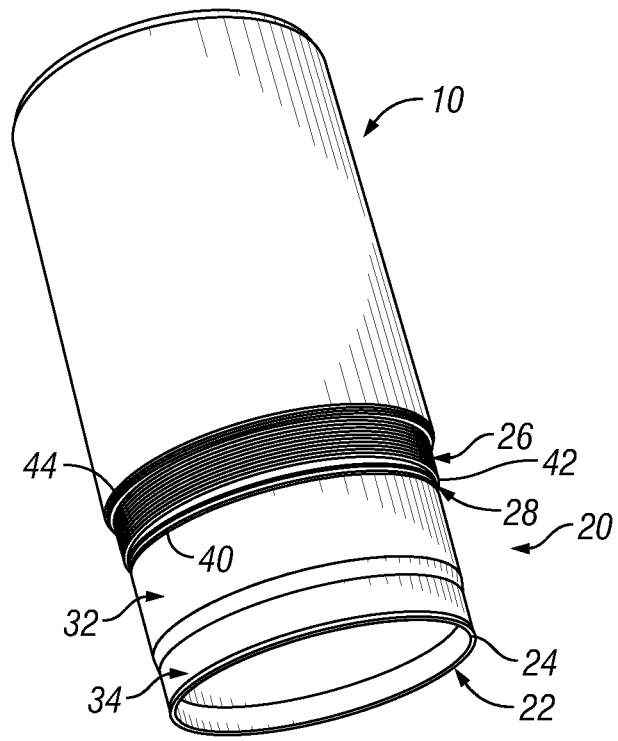
FIG. 1A is perspective view of a first tubular member having a pin end extending therefrom, wherein the pin end comprises a sealing portion for forming a metal-to-metal seal.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

It may be desirable to reduce the mechanical force required to finish the expansion of an expandable tubular member after hydraulic pressure is no longer available to move an expansion cone relative to the expandable tubular member. The mechanical force is preferably maintained sufficiently below the anchoring capacity of the tubular member in the wellbore. Further, the mechanical force is preferably maintained sufficiently below the over-pull capacity of the rig equipment as well.

A reduction of the mechanical force required to finish the expansion may be achieved by providing an up-hole "operational" casing or other tubular member that is connected to an up-hole end of the expandable tubular member. The operational casing may be used to provide a sealing surface above the expandable tubular member into which the expansion cone may travel. The connection between the operational casing and the expandable tubular member may contain the hydraulic pressure needed to expand the up-hole end of the expandable tubular member after the expansion cone is received in the operational casing. Thus, the expansion cone may move closer to the end of the expandable tubular member before hydraulic pressure is lost. In addition, the mechanical force required to finish expansion may be reduced.

Figure 1B:
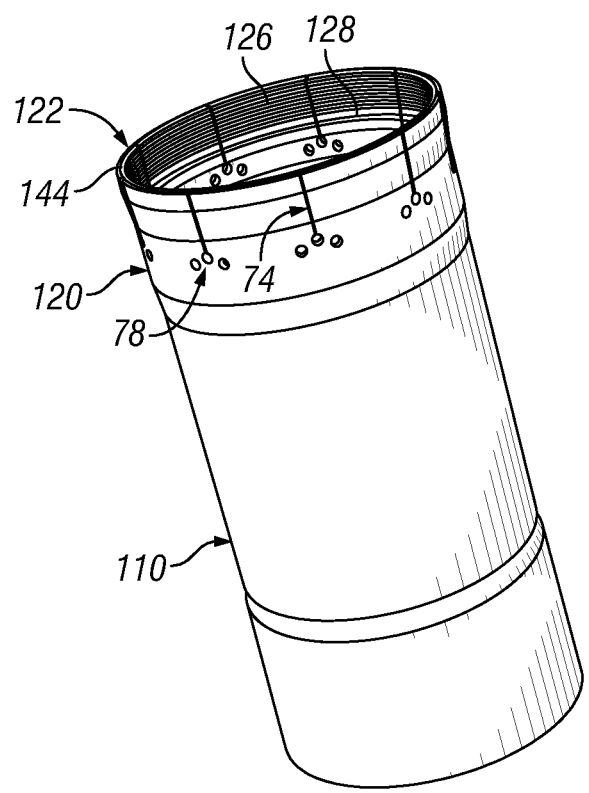
FIG. 1B is a perspective view of a second tubular member having a box end extending therefrom, wherein the box end comprises axial slits to release a pin end in response to radial expansion of the second tubular member.
Figure 2:
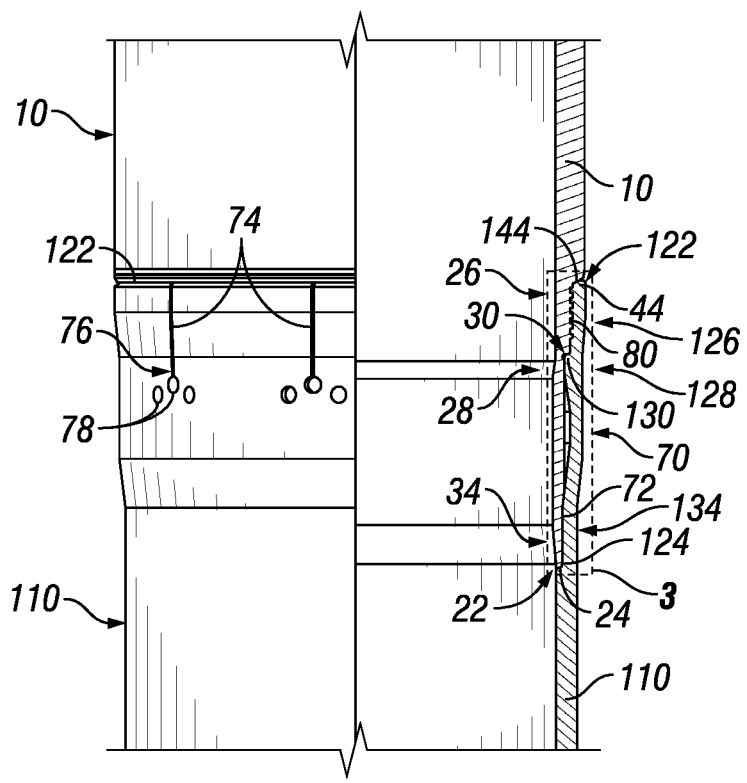
FIG. 2 is a partial elevation view, partial sectional view of a sealed releasable connection coupling the first and second tubular members shown in FIGS. 1A and 1B.

Referring initially to FIGS. 1A, 1B, and 2, a first tubular member 10 having a pin end 20 extending therefrom is shown. The pin end 20 may engage a box end 120 extending from a second tubular member 110 and cooperate therewith to make a sealed releasable connection 70. The sealed releasable connection 70 includes a threaded connection 80, a metal-to-metal seal 72, and load transfer surfaces in the form of internal shoulders 24, 124, intermediate shoulder portions 28, 128, and external shoulders 44, 144. Further, the sealed releasable connection 70 is configured to decouple the first and second tubular members 10, 110 by plastic deformation caused by an expansion cone 50 (in FIGS. 4A, 4B and 5), for example by radial expansion of the box end 120 of the second tubular member 110.

The threaded connection 80 is made by engagement of a threaded portion 26 of the first tubular member 10 with a corresponding threaded portion 126 of the second tubular member 110. The threads provided on the threaded portions 26, 126 may be configured to facilitate the release of the threaded connection by plastic deformation caused by displacement of the expansion cone 50, as further described with respect to FIGS. 4A and 4B.

The metal-to-metal seal 72 is made by engagement of a sealing portion 34 of the first tubular member 10 with a corresponding sealing portion 134 of the second tubular member 110. The sealing portions 34 and 134 are configured to maintain the metal-to-metal seal 72 between the pin end 20 and the box end 120 until most of the box end 120 of the second tubular member 110 is expanded, as further described with respect to FIGS. 4A and 4B.

Upon make-up, the threaded connection 80 is preloaded by abutment of internal shoulders 24, 124 of the pin and box ends 20, 120, respectively, and abutment of the load flanks of the threads provided on the threaded portions 26, 126. Thus, the box end 120 may be secured to the pin end 20. However, expansion of the second tubular member 110 and the pin end 20 may cause the internal shoulder 24 to disengage the internal shoulder 124, thereby relieving the threaded connection 80 from its preload and facilitating the release of the threaded connection 80 by plastic deformation caused by displacement of the expansion cone 50, as further described with respect to FIGS. 4A and 4B.

To facilitate the jump-in of the threads in the threaded portions 26 and 126 upon compression of the sealed releasable connection 70 and plastic deformation caused by the expansion cone 50, the external shoulders 44, 144 may be located such as not to be in contact after the make-up of the threaded connection 80 and not resist the jump-in, at least initially. The intermediate shoulder portions 28, 128 having outer Z profiles 30 and inner Z profile 130, respectively, may also be provided to maintain a radial clearance between the threaded portions 26 and 126 after initiation of the jump-in of the threads under sufficient compressive load and plastic deformation caused by displacement of the expansion cone 50.

To facilitate plastic deformation of the box end 120 of the second tubular member 110, the sealed releasable connection 70 comprises axial slits 74. The axial slits 74 may reach an extremity 122 of the box end 120. A stress relieving hole 78 may be provided at each ends 76 of the axial slits 74. Additional stress relieving holes may be provided offset from the ends 76 of the axial slits 74.

Figure 3:
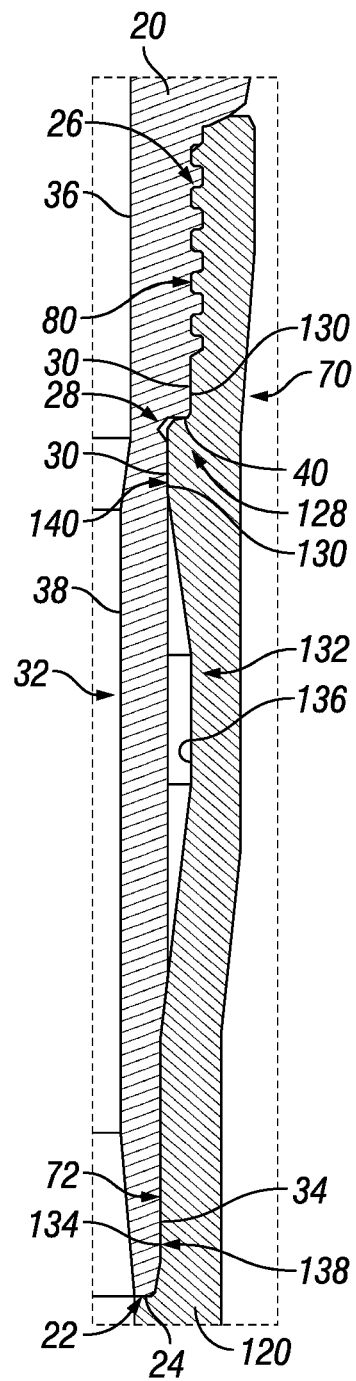
FIG. 3 is a sectional view of a portion of FIG. 2.

Turning now to FIG. 3, details of the pin end 20 extending from the first tubular member 10 and of the box end 120 extending from the second tubular member 110 are shown in sectional view.

The pin end 20 comprises the internal shoulder 24 disposed at an extremity 22 of the pin end 20, the threaded portion 26, and the intermediate shoulder portion 28 disposed between the internal shoulder 24 and the threaded portion 26. The intermediate shoulder portion 28 may have the outer Z profile 30 in sectional view such as shown in FIG. 3. The outer Z profile 30 may include a stop surface 40.

The pin end 20 may further comprise an outer groove 42 located proximate the stop surface 40. A nose extension portion 32 may extend axially from the intermediate shoulder portion 28 toward the internal shoulder 24. The sealing portion 34 may be disposed between the nose extension portion 32 and the internal shoulder 24. The sealing portion 34 forms part of the metal-to-metal seal 72. An inner diameter 38 of the nose extension portion may be less than an inner diameter 36 of the threaded portion 26. In some embodiments, a length of the nose extension portion 32 is between 10% and 50% of the diameter of the first tubular member 10, for example approximately 25% the diameter of the first tubular member 10.

The box end 120 comprises the sealing portion 134 forming part of the metal-to-metal seal 72, and the intermediate shoulder portion 128 having the inner Z profile 130. A pre-expanded portion 132 is disposed between the intermediate shoulder portion 128 and the sealing portion 134. The pre-expanded portion 132 has an inner surface 136 that is radially outward relative to an innermost surface 138 of the sealing portion 134. The inner surface 136 is radially outward relative to an innermost surface 140 of the intermediate shoulder portion 128 as well. In some embodiments, a gap exists between the inner surface 136 and the nose extension portion 32.

When the sealed releasable connection 70 is made, the inner Z profile 130 registers with the outer Z profile 30. Further, the pre-expanded portion 132 registers with the nose extension portion 32. A tension rating of the sealed releasable connection 70 may exceed the weight of the second tubular member 110. A compression rating of the sealed releasable connection 70 may exceed the over-pull capacity of the rig equipment.

Figure 4A:
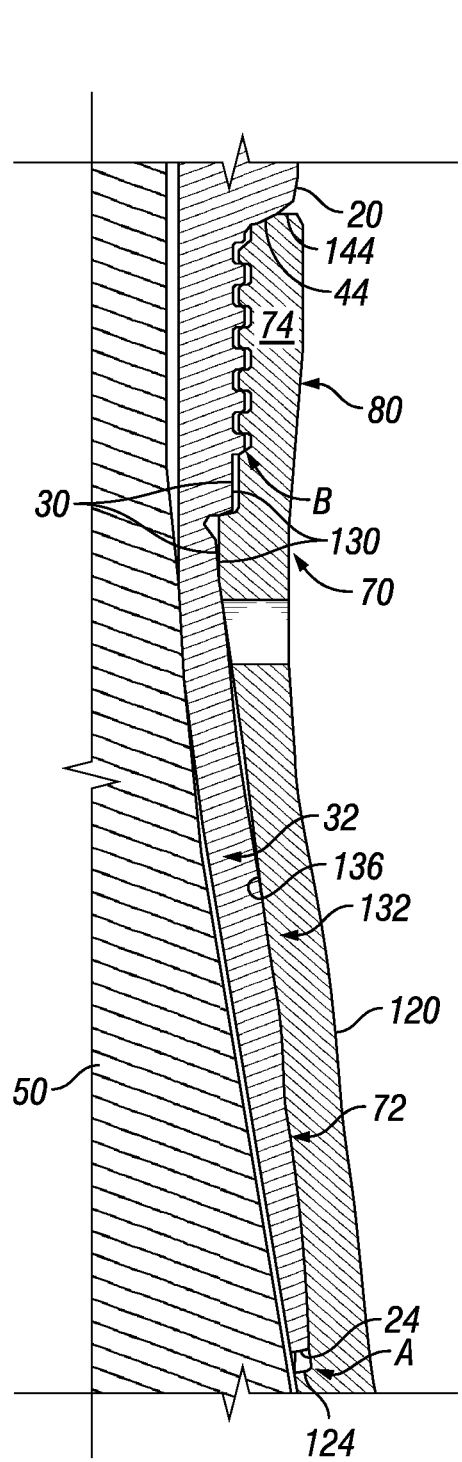
FIGS. 4A and 4B illustrate the decoupling of the first and second tubular members by plastic deformation of the second tubular member caused by displacement of an expansion cone.
Figure 4B:
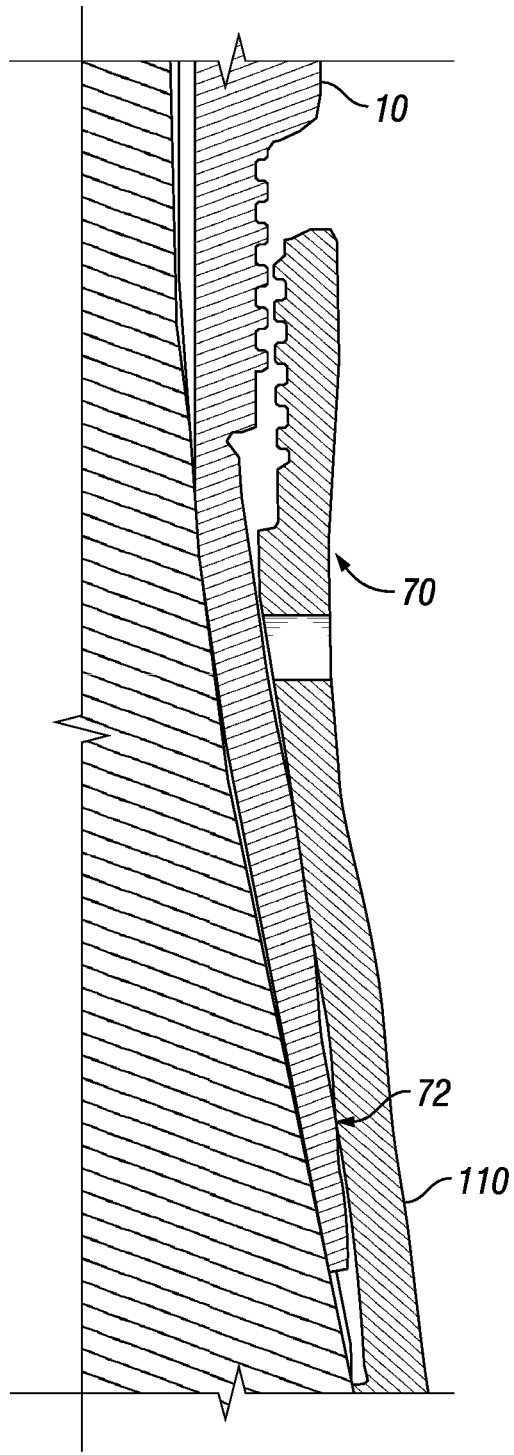

The sealed releasable connection 70 may reliably decouple the first tubular member 10 from the second tubular member 110 in both open wellbores and cased wellbores, as illustrated in FIGS. 4A and 4B. The sealed releasable connection 70 may be configured to decouple the second tubular member 110 from the first tubular member 10 by plastic deformations of the second tubular member 110 caused by displacement of the expansion cone 50 expanding the second tubular member 110. However, the first tubular member 10 may not be expanded, or may be minimally expanded, so that its outer diameter remains below a diameter of the wellbore (e.g., the wellbore 90 in FIG. 5) and it may be retrieved. After the release of the first tubular member 10, the second tubular member 110 has preferably an inner diameter that is sufficient to permit re-entry of the first tubular member 10. Further, the sealed releasable connection 70 may be designed to provide an indication at the surface that the sealed releasable connection 70 ceased to couple the first tubular member 10 with the second tubular member 110, for example by a pressure drop. Thus, an operator may retrieve the first tubular upon detection of the pressure drop.

As the expansion cone 50 deforms and radially expands the box end 120 extending from the second tubular member 110, the expansion cone 50 also engages the nose extension portion 32 of the pin end 20. As the expansion cone 50 is displaced in an up-hole direction under the forces generated by hydraulic pressure, the nose extension portion 32 is plastically deformed and expands radially into the gap between the nose extension portion 32 and the inner surface 136 of the pre-expanded portion 132. This deformation causes the internal shoulder 24 of the pin end 20 to disengage from the internal shoulder 124 of the box end 120. However, the metal-to-metal seal 72 formed by the sealing portions 34, 134 is not broken by the plastic deformation of the pin and box ends 20, 120 (see detail A in FIG. 4A).

Once the threaded connection 80 is relieved from its preload, the clearance between the external shoulders 44, 144 allows further disengagement between the threads of the threaded connection 80. Because the threads include a load flank that is at a negative angle relative to the normal to the face of the threaded portions, and a stab flank that is at a positive angle relative to the normal to the face of the threaded portions, the threads are urged to jump-in under compressive load, permitting the inner Z profile 130 to also jump-in the outer Z profile 30 (see detail B in FIG. 4A). Once misaligned, the Z profiles 30, 130 maintain clearance between the threads by pushing segments of the box end 120 located between two adjacent axial slits 74, and by plastically bending the segments. Further displacement of the expansion cone 50 displaces the first tubular member 10 without significantly deforming it as illustrated in FIG. 4B. The metal-to-metal seal 72 may be maintained as the expansion cone 50 and the first tubular member 10 leave the second tubular member 110.

Figure 5:
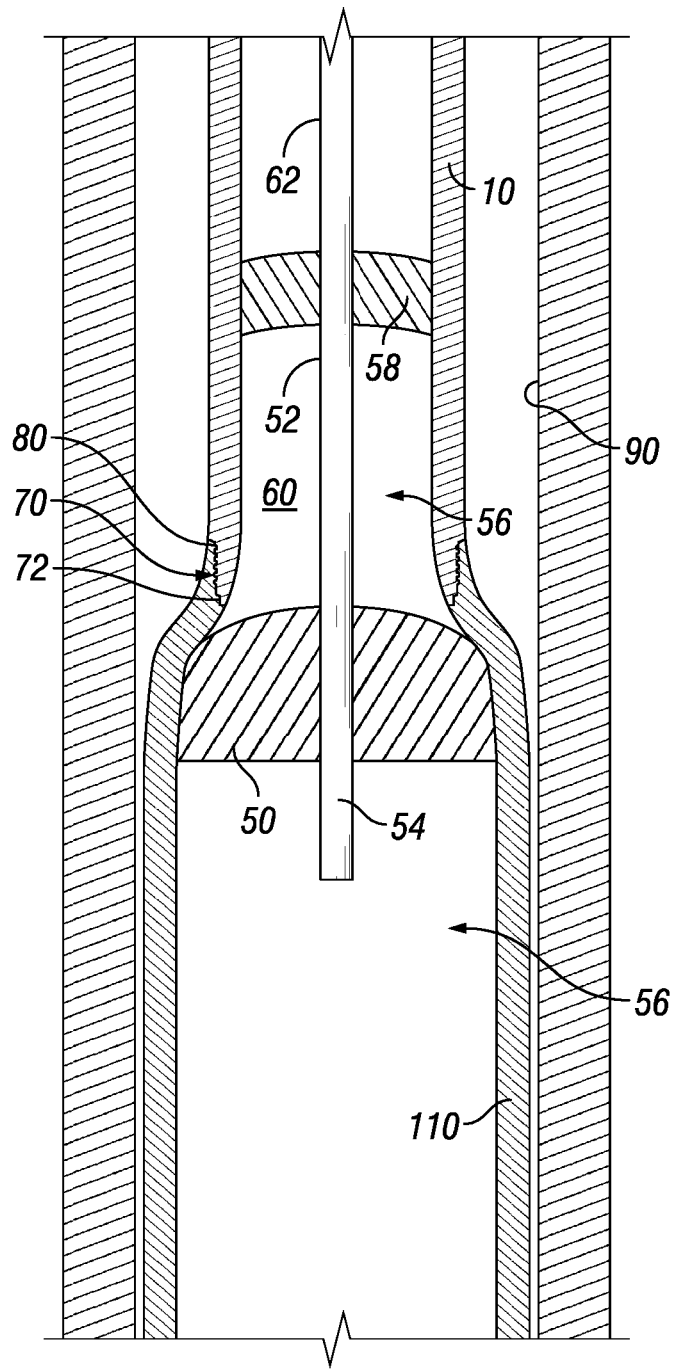
FIG. 5 is a sectional view of a downhole apparatus for installing downhole expandable tubular members in a wellbore that utilizes downhole expandable tubular members coupled with a sealed releasable connection.

Turning now to FIG. 5, a downhole apparatus that utilizes the sealed releasable connection 70 between first and second tubular members 10, 110 is shown in a wellbore 90. The apparatus includes an inner pipe 52 having a through-bore 54 to communicate hydraulic pressure from a surface pump (not shown) to a sealed volume 56 inside one or more of the first and second tubular members 10, 110. A cup 58 is coupled to the inner pipe 52 and seals the volume 56 across an annulus 60 between the inner pipe 52 and one or more of the first and second tubular members 10, 110. The pressure across the cup 58 (i.e., the pressure differential between the sealed volume 56 down-hole of the cup 58 and the volume up-hole of the cup 58) applies an upward force to the inner pipe 52. The expansion cone 50 is also coupled to the inner pipe 52, so the upward force displaces the expansion cone along the second tubular member 110.

As shown in FIG. 5, the first tubular member 10 receives the cup 58. The sealed releasable connection 70 holds the hydraulic pressure at least until the expansion cone 50 starts deforming the top of the second tubular member 110. A work string 62 may be used to pull the expansion cone 50 after the metal-to-metal seal 72 is broken.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents and alternatives falling within the spirit and scope of the present disclosure.

What is claimed is:

1. A downhole apparatus, comprising:
   a first tubular member disposed in a wellbore;
   a second tubular member disposed in the wellbore;
   an expansion cone coupled to the second tubular member;
   a threaded connection coupling the first and second tubular members;
   axial slits formed in the second tubular member to release the threaded connection in response to plastic deformation of the second tubular member caused by the expansion cone; and
   a metal-to-metal seal between the first and second tubular members;
   a pin end extending from the first tubular member, the pin end comprising:
   an internal shoulder disposed at an extremity of the pin end;
   a threaded portion;
   an intermediate shoulder portion having an outer Z profile and disposed between the internal shoulder and the threaded portion;
   a nose extension portion extending axially from the intermediate shoulder portion toward the internal shoulder; and
   a sealing portion partially forming the metal-to-metal seal and disposed between the nose extension portion and the internal shoulder; and
   a box end extending from the second tubular member, the box end comprising:
   a sealing portion partially forming the metal-to-metal seal;
   an intermediate shoulder portion having an inner Z profile;
   a portion disposed between the intermediate shoulder portion and the sealing portion, wherein the portion has an inner surface radially outward relative to innermost surfaces of the sealing and the intermediate shoulder portions; and
   an internal shoulder disposed proximate the sealing portion.

2. The downhole apparatus of claim 1, wherein the axial slits reach an extremity of the second tubular member.

3. The downhole apparatus of claim 1, further comprising: a stress relieving hole formed at an end of at least one of the axial slits.

4. The downhole apparatus of claim 1, wherein the nose extension portion has an inner diameter that is less than an inner diameter of the threaded portion.

5. The downhole apparatus of claim 1, wherein the outer Z profile of the intermediate shoulder portion comprises a stop surface, and further comprising an outer groove located proximate the stop surface.

6. The downhole apparatus of claim 1 further comprising:
   an inner pipe having a through-bore to communicate pressure to a sealed volume inside one or more of the first and second tubular members;
   a cup coupled to the inner pipe and sealing the sealed volume across an annulus between the inner pipe and one or more of the first and second tubular members, whereby the pressure across the cup applies a force to the inner pipe; and
   the expansion cone being coupled to the inner pipe down-hole the sealing cup, whereby the force applied to the inner pipe displaces the expansion cone along one or more of the first and second tubular members.

7. The downhole apparatus of claim 1, wherein the portion that has the inner surface radially outward registers with the nose extension portion and the inner Z profile registers with the outer Z profile.

8. An apparatus, comprising:
   a first downhole tubular member;
   a second downhole tubular member that is radially expandable; and
   a sealed releasable connection coupling the first and second downhole tubular members and configured to decouple the first and second downhole tubular members by expansion of the second downhole tubular member, the sealed releasable connection having a metal-to-metal seal formed between the first and second downhole tubular members, wherein the sealed releasable connection includes:

axial slits formed in the second tubular member to facilitate plastic deformation of the second tubular member;

a pin end having an external shoulder, an intermediate shoulder portion having an outer Z profile, a threaded portion disposed between the external shoulder and the intermediate shoulder portion, a nose extension portion extending axially from the intermediate shoulder portion, and a sealing portion partially forming the metal-to-metal seal and extending axially from the nose extension portion, and a box end having a sealing portion partially forming the metal-to-metal seal, an intermediate shoulder portion having an inner Z profile, and a portion disposed between the intermediate shoulder portion and the sealing portion, wherein the portion has an inner surface radially outward relative to innermost surfaces of the sealing and the intermediate shoulder portions.

9. The apparatus of claim 8, wherein the portion that has the inner surface radially outward registers with the nose extension portion and the inner Z profile registers with the outer Z profile.

10. A method of expanding downhole tubular members comprising:
coupling a first tubular member and a second tubular member with a releasable threaded connection, the second tubular member comprising axial slits to facilitate plastic deformation of the second tubular member;
forming a metal-to-metal seal between the first and second tubular members;
providing the first and second tubular members in a wellbore;
displacing an expansion cone through the second tubular member to plastically deform the second tubular member;
releasing the threaded connection and the first and second tubular members by displacing the expansion cone through the threaded connection; and
relieving a make-up preload while maintaining the metal-to-metal seal during plastic deformation.

11. The method of claim 10, wherein a pin end of the first tubular member comprises a sealing portion partially forming the metal-to-metal seal and a nose extension portion extending axially, wherein a box end of the second tubular comprises a sealing portion partially forming the metal-to-metal seal and a portion that has an inner surface radially outward relative to innermost surface of the sealing portion, the method comprising:
plastically deforming the nose extension portion with the expansion cone into a gap between the nose extension portion and the portion that has the inner surface radially outward;
plastically bending segments of the box end located between two adjacent axial slits to disengage threads of the threaded connection;
displacing the first tubular member inside the second tubular member with the expansion cone without deforming the first tubular member after the nose expansion portion is plastically deformed; and
maintaining the metal-to-metal seal during the displacement of the first tubular inside the second tubular member after plastically bending the segments of the box end.

12. The method of claim 11 wherein the pin end of the first tubular member further comprises:
an internal shoulder disposed at an extremity of the pin end;
a threaded portion;
an intermediate shoulder portion having an outer Z profile and disposed between the internal shoulder and the threaded portion;
wherein the nose extension portion extends axially from the intermediate shoulder portion toward the internal shoulder; and
wherein the sealing portion partially forming the metal-to-metal seal is disposed between the nose extension portion and the internal shoulder.

13. The method of claim 12, wherein the box end of the second tubular member further comprises:
an intermediate shoulder portion having an inner Z profile; wherein the portion that has the inner surface radially outward relative to the innermost surfaces of the sealing portion of the box end is disposed between the intermediate shoulder portion and the sealing portion of the box end; and
an internal shoulder disposed at an end of the sealing portion,
wherein the inner surface is radially outward relative to the intermediate shoulder portion.

14. The method of claim 13 further comprising:
registering the portion of the second tubular member that has the inner surface radially outward with the nose extension portion of the first tubular member; and
registering the inner Z profile of the second tubular member with the outer Z profile of the second tubular member.

15. The method of claim 14 further comprising disengaging the internal shoulder of the box end from the internal shoulder of the pin end during radial expansion of the second tubular member.

16. The method of claim 15 further comprising:
communicating pressure from a surface pump to a sealed volume inside the second tubular member;
applying the pressure to a cup sealing the sealed volume, wherein the cup is coupled to the expansion cone; and
displacing the cup to the first tubular member while maintaining the pressure in the second tubular member.

17. The method of claim 16 further comprising pulling on the expansion cone via a work string after the metal-to-metal seal formed between the first and second tubular members is broken.

* * * * *